United States Patent
Menominee et al.

(10) Patent No.: US 9,895,721 B2
(45) Date of Patent: Feb. 20, 2018

(54) ROTISSERIE OVEN WITH SHOOTER TUBE CLEANING SYSTEM

(71) Applicant: Alto-Shaam, Inc., Menomonee Falls, WI (US)

(72) Inventors: Kim J. Menominee, Menomonee Fall, WI (US); Nikita Dobrinin, Menomonee Fall, WI (US); Jeremy Means, Waukesha, WI (US); Thomas Rand, Cedarburg, WI (US); Andrew Szczepaniak, Hartland, WI (US); Eric Tranmal, Milwaukee, WI (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 126 days.

(21) Appl. No.: 14/926,502

(22) Filed: Oct. 29, 2015

(65) Prior Publication Data
US 2017/0122570 A1    May 4, 2017

(51) Int. Cl.
| | | |
|---|---|---|
| B08B 3/02 | (2006.01) | |
| B08B 3/08 | (2006.01) | |
| B08B 9/00 | (2006.01) | |
| B08B 9/093 | (2006.01) | |
| F24C 15/14 | (2006.01) | |
| F24C 14/00 | (2006.01) | |
| F24C 15/16 | (2006.01) | |
| A47J 31/60 | (2006.01) | |
| A47J 37/04 | (2006.01) | |

(52) U.S. Cl.
CPC .......... B08B 3/08 (2013.01); B08B 3/02 (2013.01); B08B 9/00 (2013.01); B08B 9/093 (2013.01); F24C 14/005 (2013.01); F24C 15/14 (2013.01); F24C 15/164 (2013.01); A47J 31/60 (2013.01); A47J 37/042 (2013.01)

(58) Field of Classification Search
CPC ...... F24C 14/005; F24C 15/14; F24C 15/164; B08B 3/02; B08B 9/00; B08B 9/093; B08B 3/08; A47J 31/60; A47J 37/042
See application file for complete search history.

(56) References Cited

U.S. PATENT DOCUMENTS

| | | | |
|---|---|---|---|
| 8,151,697 B2 | 4/2012 | Valentine et al. | |
| 8,375,848 B2 | 2/2013 | Valentine et al. | |
| 8,752,538 B2 * | 6/2014 | Valentine | A47J 37/042 126/1 R |
| 2014/0076360 A1 * | 3/2014 | Furlanetto | A21B 3/006 134/18 |

* cited by examiner

Primary Examiner — Saeed T Chaudhry
(74) Attorney, Agent, or Firm — Boyle Fredrickson S.C.

(57) ABSTRACT

A grease removal system for an oven that collects excess grease during a cook cycle into a reservoir, which also serves as a container for cleaning solution during a clean cycle. A high-pressured shooter tube allows the cleaning solution to be shot from the reservoir to a ceiling of the oven cavity without the need for extra tubing.

19 Claims, 4 Drawing Sheets

ROTISSERIE OVEN WITH SHOOTER TUBE CLEANING SYSTEM

CROSS-REFERENCE TO RELATED APPLICATIONS

—

BACKGROUND OF THE INVENTION

The present invention relates generally to cooking implements, and in particular relates to a cleaning system for rotisserie ovens.

Rotisserie ovens are traditionally used to cook raw meat and poultry product, such as chicken, duck and the like, inside a cooking chamber. In particular, a food product to be prepared is carried by a rotating spit assembly that brings the food product into communication with a radiating heat source that cooks, and in some cases, browns the outer surface of the food product.

Some food product, when cooked, produces significant quantities of grease which may be allowed to drain away from the food and to be captured in a drip pan positioned at the bottom of the oven. The drip pan may be attached to a drain line to allow gravity draining of the grease into a removable collection container. One method of providing such a drainage system is described in U.S. Pat No. 7,421,942 entitled "Grease Collection System for Oven," the disclosure of which is hereby incorporated by reference. For ovens using steam to cook food, the grease may drip into a water-filled condenser chamber and subsequently be pumped out of the chamber for disposal. This method is described in U.S. Pat. No. 8,997,731 entitled "Grease Handling Apparatus for Closed System Oven," the disclosure of which is hereby incorporated by reference.

SUMMARY OF THE INVENTION

The present invention provides a grease removal system for a rotisserie oven, having radiation and convection heating, that collects excess grease during a cook cycle into a reservoir, which also serves as a container for cleaning solution during a clean cycle. A high-pressured shooter tube allows the cleaning solution to be shot from the reservoir to the top walls of the oven cavity without the need for additional tubing.

In one embodiment, the present invention may be an oven having an oven housing defining a cooking volume and having a door providing access to a cooking volume and sealing the cooking volume when the door is in a closed position; a heater communicating with the cooking volume to heat the same; and a cleaning assembly including a reservoir chamber communicating with the cooking volume through a drain opening in a floor of the oven volume, a first suction pump communicating through a first opening in the reservoir to pump a cleaning solution out of the reservoir and expel the cleaning solution to the cooking volume through a nozzle positioned below a center of the cooking volume between a ceiling of the oven volume and the floor of the oven volume, and a conduit communicating with a second opening in the reservoir chamber and a collection container to permit the movement of grease out of the reservoir into the collection container.

It is thus a feature of at least one embodiment of the invention to provide a nozzle that is integrated into the oven for automatic cleaning and is located, near the bottom of the oven so that additional tubing is not needed.

The nozzle may be configured to expel the cleaning solution through the drain opening.

It is thus a feature of at least one embodiment of the invention to provide a single opening at the oven floor to avoid leakage.

The nozzle may be concentric with the drain opening to provide clearance around the nozzle for grease and wastewater pass-through.

It is thus a feature of at least one embodiment of the invention to allow grease and wastewater to drain around the nozzle.

The nozzle may be configured to expel the cleaning solution through a floor of the oven. The nozzle may extend in a generally upward direction from the floor of the oven volume.

It is thus a feature of at least one embodiment of the invention to position the nozzle so that it may expel the solution to the oven ceiling.

The oven may further include an electronic computer communicating with the heater element, the first pump, and a second pump communicating with the conduit and executing a program stored in a non-transient medium to (a) receive commands from the user indicating a cooking schedule associated with cooking times and temperatures; (b) activate the second pump according to a selection of a cooking schedule indicating cooking of grease producing foodstuffs; (c) receive commands from the user indicating a cleaning schedule associated with cleaning times and temperatures; and (d) activate the first pump according to a selection of the cleaning schedule.

It is thus a feature of at least one embodiment of the invention to allow the user to operate pre-programmed cooking and cleaning schedules.

A valve may be disposed in the conduit that can be actuated to control grease flow from the reservoir into the collection container.

It is thus a feature of at least one embodiment of the invention to expel grease from the reservoir using a valve or pump arrangement.

The oven may further include a conduit communicating with a third opening in the reservoir chamber and a freshwater source to provide freshwater into the reservoir.

It is thus a feature of at least one embodiment of the invention to allow recirculation of the cleaning solution and provide cleaning of the reservoir chamber.

The oven may further include a third pump communicating with a third opening in the reservoir chamber and a cleaning solution source to pump cleaning solution into the reservoir.

It is thus a feature of at least one embodiment of the invention to allow for automatic filling of cleaning solution into the reservoir.

The nozzle may be positioned to expel a stream of cleaning solution to a ceiling of the cooking volume.

It is thus a feature of at least one embodiment of the invention to allow for pressure cleaning of the top wall of the oven and avoid the beater or fan used in steam cleaning.

The first suction pump may be sized to provide sufficient force and volume to exert a stream of cleaning solution to a ceiling of the cooking volume.

It is thus a feature of at least one embodiment of the invention to provide a direct steam of cleaning solution to clean the entire oven cavity.

The oven may include a radiating heating system disposed in the cooking volume that receives an electrical current and produces radiating heat; a convection heat system disposed in the cooking volume including one or more heating elements that produce heat in response to an electrical current and a rotating fan that draws incoming air from the cooking volume into the convection heat system, forces the air over the heating elements to become heated, and expels the heated air into the cooking volume; and a spit assembly rotatably attached proximal the side walls and carrying at least one spit configured to support a food product that is heated by the radiating heat source and the convection heat source.

It is thus a feature of at least one embodiment of the invention to use the cleaning system with a rotisserie oven, which typically does not include a water-filled condenser chamber.

The present invention may further include a method of operating an oven, the method including the steps of (a) providing an oven having an oven housing defining a cooking volume and having a door providing access to a cooking volume and sealing the cooking volume when the door is in a closed position; a heater communicating with the cooking volume to heat the same; a cleaning assembly including a reservoir chamber communicating with the cooking volume through a drain opening in the floor of the oven volume, a first suction pump communicating through an opening in the reservoir to pump cleaning solution out of the reservoir and expel the cleaning solution to the cooking volume through a nozzle positioned below a center of the cooking volume between a ceiling of the oven volume and the floor of the oven volume, and a second suction pump communicating with an opening in the reservoir to pump grease out of the reservoir; (b) activating the second suction pump to pump grease from the reservoir; (c) introducing a cleaning agent into the reservoir to produce a cleaning solution; and (d) activating the first suction pump to pump the cleaning solution from the reservoir through the nozzle.

It is thus a feature of at least one embodiment of the invention to provide for an automatic cleaning cycle after a cooking cycle whereby the grease pump is only operated during the cooking cycle.

The method may further include a step between steps (b) and (c) of opening a water inlet valve to allow freshwater to fill the reservoir chamber.

It is thus a feature of at least one embodiment of the invention to automatically create a cleaning solution.

The method may further include a step after step (d) of activating a third suction pump to remove wastewater from the reservoir chamber.

It is thus a feature of at least one embodiment of the invention to remove grease and wastewater through a common drain.

Step (c) may further include activating a fourth pump to pump liquid cleaner into the reservoir chamber.

It is thus a feature of at least one embodiment of the invention to allow the addition of cleaning solution to be automated.

Step (c) may further include inserting a cleaning tablet into the reservoir chamber through the drain opening.

It is thus a feature of at least one embodiment of the invention to allow the user to use cleaning tablets to produce the cleaning solution.

The oven may further include a spit assembly rotatably attached proximal the sidewalls and carrying at least one spit configured to support a food product that is heated by the heater, and further providing a step of rotating the spit assembly during step (d).

It is thus a feature of at least one embodiment of the invention to utilize the natural movement of the spit assembly to facilitate dispersal of the cleaning solution to the oven walls.

These particular objects and advantages may apply to only some embodiments falling within the claims and thus do not define the scope of the invention.

DETAILED DESCRIPTION OF THE INVENTION

Figure 1:
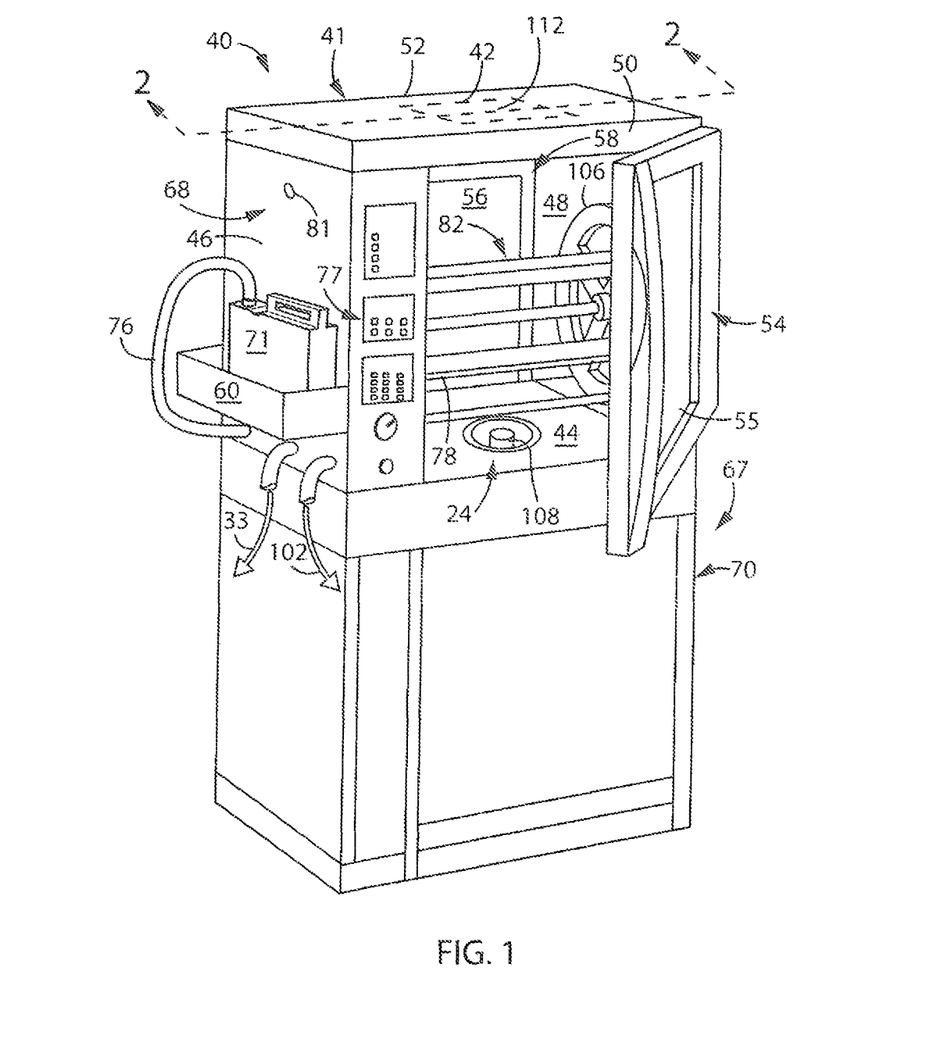
FIG. 1 is a perspective view of a rotisserie oven stacked on top of a warming chamber in accordance with the preferred embodiment.

Referring initially to FIG. 1, a rotisserie over 40 includes an outer housing 41 having upper and lower walls 42 and 44, respectively, opposing left and right sidewalls 46 and 48, respectively, and opposing front and rear walls 50 and 52, respectively. A cooking chamber 58 is defined by upper and lower walls 42 and 44, right side wall 48, and a left chamber side wall 64 spaced inwardly from, and extending parallel to, oven sidewall 46.

Walls 64 and 46 thus define the lateral boundaries of a cabinet 68 that contains control components (e.g., a microprocessor or other suitable controller) of oven 40. In particular, cabinet 68 houses a control assembly 110 (see FIG. 3) that controls various aspects of the oven 40, such as cooking sequences, draining functions, and cleaning functions as is described in more detail below. Cabinet 68 further houses a motor 74 (see FIG. 4A) that drives a spit assembly 82. Oven operation is controlled by an operator via a set of user controls and outputs 77 that are disposed on the front wall 50 of cabinet 68. An indicator 81, such as a light or an audible alarm, can be disposed anywhere on the oven, including at the chef side or the server side, and can be activated either manually or automatically via controls 77 upon completion of a cooking sequence.

A front door assembly 54 is connected to the front wall 50, and a rear door assembly 56 is carried by the rear wall 52, that can both be opened and closed to provide access to cooking chamber 58. Front door assembly 54 includes a window assembly 55 that provides visible access to the cooking chamber 58. Rear door assembly 56 may be constructed in the manner described with respect to front door assembly 54. Oven 40 thus has a pass-through design as described in U.S. Pat. No. 6,608,288, the disclosure of which is hereby incorporated by reference, and thus may further be used in accordance with the methods described therein.

For instance, one such method of using an oven of the type having a heating cavity that utilizes cooking elements to produce a prepared food product from a raw food product, a chef-side access assembly including a first door for the insertion of raw food product into the cavity, and a server-side access assembly located remote from the chef-side access assembly and including a second door for the removal of prepared food product from the cavity, can include the step of first inserting raw food product into the cavity via the first door. Next, the cooking elements (preferably the rotisserie cooking elements, as are described in more detail below) are activated via controls 77. Next, indicator 81 is activated once the raw food product has been prepared. Finally, in response to indicator 81 the prepared food product can be removed from cooking chamber via the rear, server-side door 56.

The rotisserie oven 40 can be mounted on top of a warming chamber 67 including a housing 70 of generally the same size and shape as housing 41, and an internal warming chamber (not shown) of generally the same size and shape of cooking chamber 58. Advantageously, the rotisserie oven 40 and warming chamber 67 may be stacked on top of each other. Ovens 40 and 72 are modular, such that oven 40 has rotisserie and/or convection heating components installed and warming chamber 72 may have a conductive heating systems installed that are configured to maintain the temperature of the food product that was prepared in the rotisserie oven. Oven 40 can alternatively be supported on for instance, a kitchen floor directly via any suitable conventional a support assembly. For example, oven 40 can be supported by support legs with wheels for ease of maneuvering or with support feet for stabilized positioning.

Figure 4A:
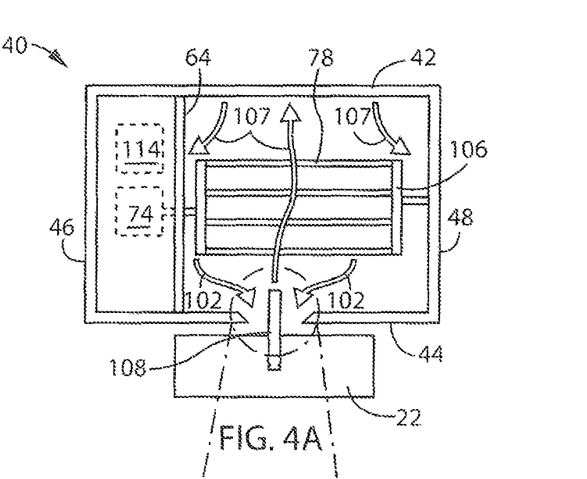
FIGS. 4A and 4B is a cross-section similar to FIG. 2 showing the oven cavity and an enlarged cross-sectional perspective view of the shooter tube and reservoir opening.

Referring in addition to FIG. 4A, spit assembly 82 includes a plurality of spits (collectively identified as 78) that span between sidewalls 46 and 48 of the cooking chamber 58. Specifically, spits 78 span between a pair of support discs 106 (one shown in FIG. 1) and are suitable for retaining meat product such as chicken, turkey, duck, and the like. Discs 106 are rotated under power supplied by motor 74 to correspondingly rotate the meat product with respect to a heat source or sources. The cooking chamber 58 incorporates a convection heat source 114 that is used to cook raw food product along with a radiation heat system 112 that browns the food being prepared.

A recess is formed in left chamber sidewall 64 that carries a convection heating system 114 that includes a standard resistive coil in the form of a loop that is connected to controls 77 and produces heat in response to an electrical current input. A fan is disposed inside the loop formed by the coil, and includes a circular plate supporting a plurality of circumferential fan blades that rotate about a hub to draw air into heating system 114 from cooking chamber 58. The air is also expelled radially outwardly by the fan blades, thereby forcing the air to flow across the resistive coil before being expelled into the cooking chamber 58 to heat the food product.

Oven 40 further includes a radiating heat system 112 that delivers radiating heat to food product carried by spit assembly 82. Radiating heat system 112 may be centrally disposed above spit assembly 82 at upper wall 42. Radiation heat system 112 includes a plurality of rectangular ceramic discs having grooves that at least partially enclose traditional resistive coils. In particular, the bottom of the coil (when positioned as installed in the cooking chamber 58) is essentially coated with a ceramic material which has been found to emit infrared heat that is less scattered compared to coils that are not embedded in ceramic. The food product is thus browned more uniformly than conventionally achieved. The coils are connected via electrical leads to the control, and emit heat upon an electrical current input. Accordingly, heat is produced in response to the supply of electrical power to the coils, which is controlled via user controls 77, in order to prepare food product rotating with spit assembly 82.

The outer housing 41 of oven 40 may provide a shelf or caddy 60 attached to the outer surface of the oven side wall 46 for supporting a container for retaining, for example, a concentrated cleaning solution to be pumped into the oven 40, as will be further described below.

Figure 3:
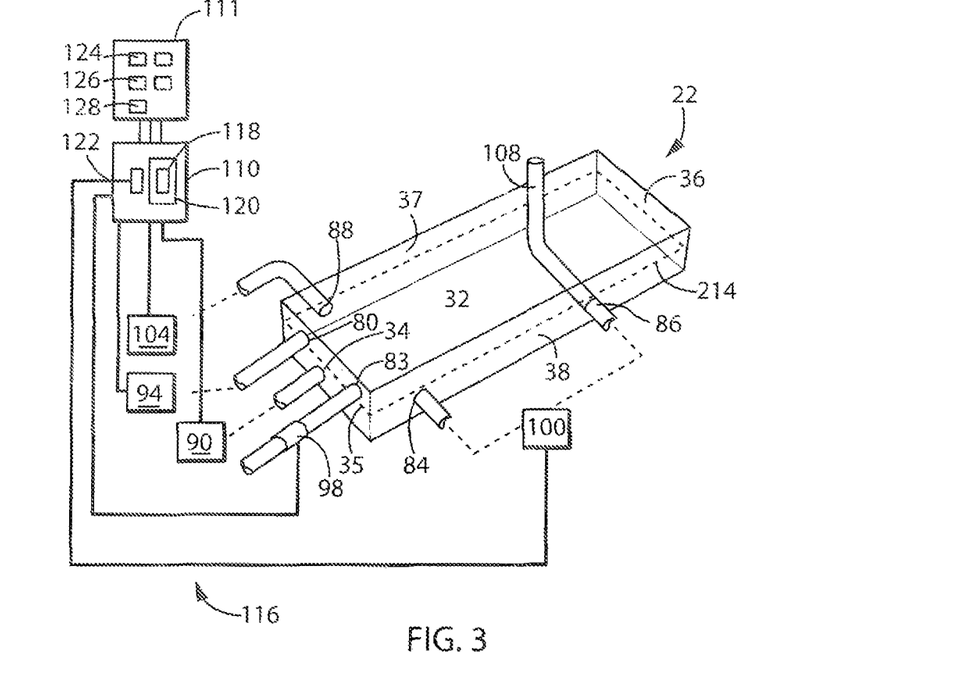
FIG. 3 is an orthographic view of the grease management system showing connection to other oven elements including a computer controller board and various pump elements.

A controller board 110 within the housing 41 may provide an electronic computer or microcontroller receiving instructions from controls 77 accessible on the front of the oven 40, and having, for example membrane switches that may be activated by the user. As will be discussed in greater detail below, the controller board 110 generally provides an electronic computer executing a stored program 118 to control, for example, the radiating heating system 112, convection heat system 114, spit motor 74, and cleaning assembly 116, to be described further below, turning them on and off as necessary to implement a particular cooking schedule or cleaning schedule.

The rotisserie oven 40 may be as generally described in U.S. Pat. No. 7,487,716, the disclosure of which is hereby incorporated by reference, and further adapted as provided in the disclosure provided herein.

Figure 2:
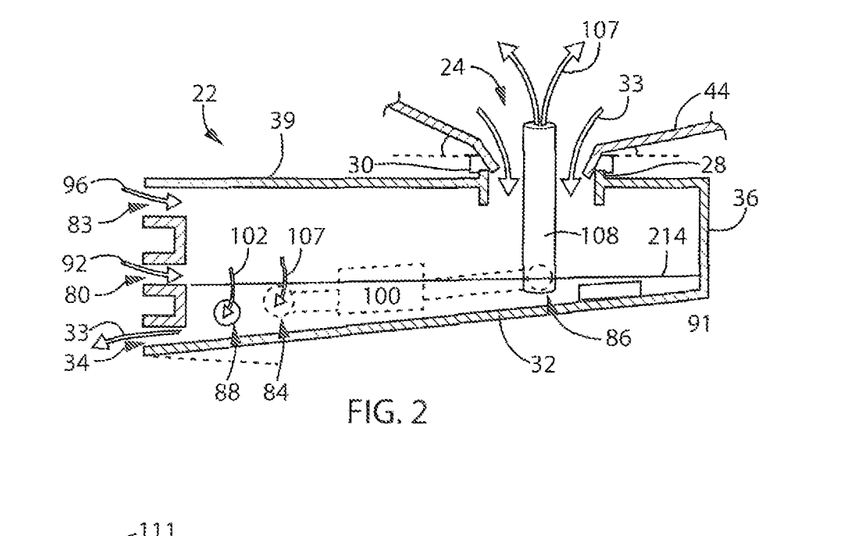
FIG. 2 is a fragmentary cross-section along line 2-2 of FIG. 1 showing a first embodiment of the grease management system of the present invention providing for the collection of grease and cleaning solution through a common drain opening.

Referring now to FIGS. 1 and 2, a cleaning assembly 116 of oven 40 provides a reservoir chamber 22 positioned with respect to a lower wall 44 of the cooking chamber 58 so that a drainage aperture 24 of lower wall 44 is located directly above a drainpipe 28 of the reservoir chamber 22, the latter being a short tube extending vertically upward to the drainage aperture 24 when the reservoir chamber 22 is positioned beneath the lower wall 44. The drainpipe 28 allows grease and oil 33 passing through the drainage aperture 24 to enter the reservoir chamber 22 under the influence of gravity. The lower wall 44 may be inclined toward the drainage aperture 24 to facilitate the drainage of grease and oil 33 through the drainage aperture 24.

Referring now to FIGS. 2 and 3, the reservoir chamber 22 provides a generally enclosed box having a bottom wall 32 sloping downwardly from an end closest to the drainpipe 28 to an opposite end adjacent to a grease discharge port 34. In an alternative configuration (not shown), the bottom wall 32 is generally horizontal. Upstanding sidewalls 35, 36, 37, 38 around the periphery of the bottom wall 32 retain accumulated grease and cleaning solution within the reservoir chamber 22 as will be described further below. Left sidewall 35 opposite right sidewall 36 define a left and right end, respectively, with respect to the oven 40, and are connected at their front and rear edges by sidewalls 37, 38 defining a front and rear end, respectively, with respect to the oven 40. These upstanding sidewalls 35, 36, 37, 38 are joined at their upper edges to a generally horizontal upper wall 39 adjacent to a bottom of the reservoir chamber 22. The upper wall 39 carries the drainpipe 28 which aligns with the draining aperture 24 of the lower wall 44. The lower end of the drainpipe 28 extends below the upper wall 39 and above the water level 26. In an alternative embodiment (not shown), the drainpipe 28 extends upward but stops at the upper wall 39 so that it does not extend below the upper wall 39.

Figure 4B:
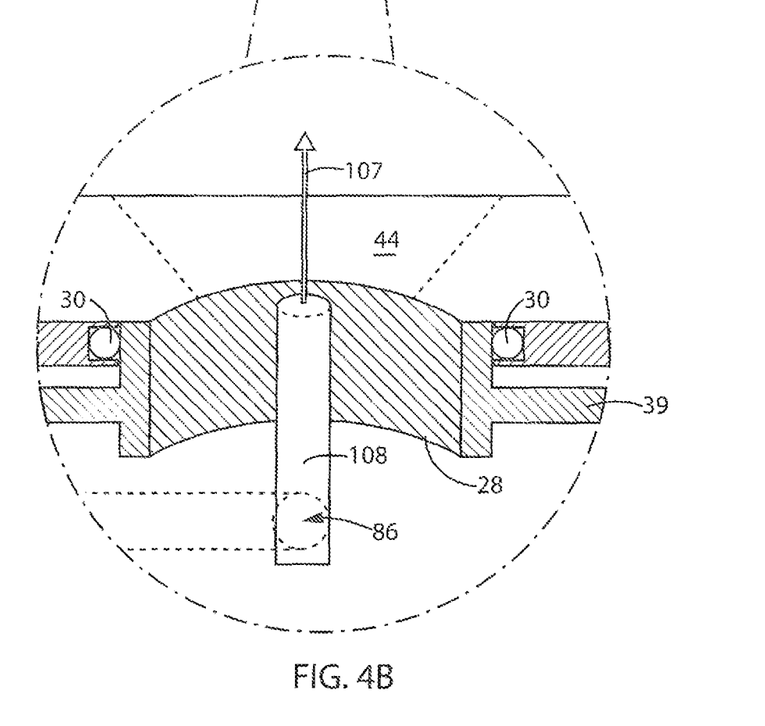

Referring also to FIGS. 4A and 4B, a shooter tube 108 extends horizontally into the reservoir chamber 22 from the front sidewall 38 toward the rear sidewall 37, ending generally midway between the front and rear sidewalls 37 and 38, and closer to the right sidewall 36 than the left sidewall 35. The shooter tube 108 is generally centered below the drainpipe 28 and drainage aperture 24 to further extend vertically upward through the drainpipe 28. The shooter tube 108 may be generally concentric with the drainpipe 28 opening. The shooter tube 108 extends slightly above the drainpipe 28 to reside within the draining aperture 24. However, it is possible for the shooter tube 108 to extend through and reside above the draining aperture 24 or within or below the drainpipe 28.

The diameter of the drainage aperture 24 and drainpipe 28 opening are generally similar, with the diameter of the drainpipe 28 opening at least as large as the drainage aperture 24 to prevent leakage. The drainage aperture 24 may be facilitated by a downwardly and inwardly inclined lip which helps to funnel the fluid to the drainpipe 28. An O-ring 30 or gasket may be positioned between a lip of the drainage aperture 24 and the drainpipe 28 to create a seal at the interface therebetween.

The shooter tube 108 generally has a diameter less than the diameter of the drainage aperture 24, and generally less than half the diameter of the drainage aperture 24 and drainpipe provide sufficient clearance around the shooter tube 108. The clearance allows for the flow of fluids, such as grease, oil, and wastewater through the drainpipe 28 around the shooter tube 108. The clearance also allows for the insertion of cleaning tablets into the reservoir chamber 22, to be further described below.

Referring again to FIGS. 2 and 3, left sidewall 35 provides a grease discharge port 34, a liquid cleaner inlet port 80, and a freshwater inlet port 83. The grease discharge port 34 provides for a flow of grease and oil 33 out of the reservoir chamber 22 through a conduit passing to and facilitated by a grease discharge pump 90 or suction pump. The grease discharge port 34 is generally arranged close to the bottom wall 32 to collect grease and oil 33 from a bottom of the reservoir chamber 22. The liquid cleaner inlet port 80 provides for flow of concentrated liquid cleaner 92 into the reservoir chamber 22 through a conduit passing from a pump 94. Freshwater inlet port 83 provides for a flow of freshwater 96 from a freshwater source through a conduit and into the reservoir chamber 22 and may be controlled by a valve 98. Liquid cleaner inlet port 80 and freshwater inlet port 83 are generally centered between the bottom wall 32 and upper wall 39, or close to the upper wall 39 to be above a water level 214, to be further described below.

Front sidewall 38 provides cleaning solution outlet port 84 and shooter tube port 86. The cleaning solution outlet port 84 allows for the flow of cleaning solution 107 out of the reservoir chamber 22 through a conduit passing to and facilitated by a pump 100. The pump 100 proceeds to pump the cleaning solution 107 through a conduit to the shooter tube port 86 and into the shooter tube 108 extending within the reservoir chamber 22. The cleaning solution outlet port 84 is generally arranged close to the bottom wall 32 to collect cleaning solution from a bottom of the reservoir chamber 22.

Rear sidewall 37 provides waste drain port 88. Drainage port 88 allows for a flow of wastewater 102 out of the reservoir chamber 22 through a conduit passing to and facilitated by a suction pump 104. The drainage port 88 is generally arranged close to the bottom wall 32 to drain wastewater 102 from a bottom of the reservoir chamber 22.

It is understood that the location of the ports may be changed to any sidewall 35, 36, 37, 38, 39, 44 of the reservoir chamber 22 and to any position on the sidewall, It is also understood that a pump or valve described above may be interchanged, or may be substituted by other known mechanisms for moving or controlling the flow of fluids, as understood in the art. It should be appreciated that the valve may be an automatic valve that is electrically connected to the oven circuitry and may be programmed to open and close according to the cooking or cleaning program, or opened and closed by the user via controls. Alternatively, the valve can be a manually actuated valve that is opened and closed using a knob or like handle that extends out from the valve.

Figure 5:
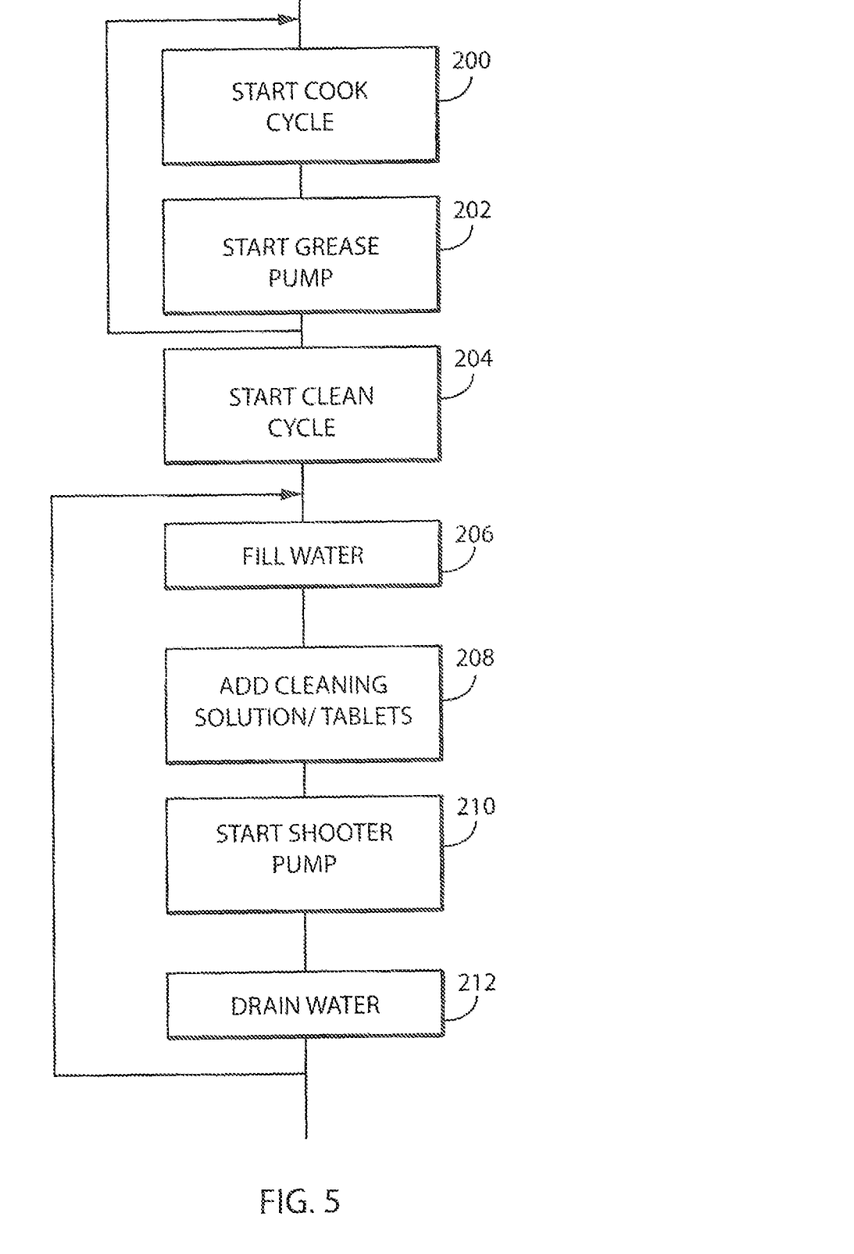
FIG. 5 is a simplified flowchart of the program executed by the controller board of FIG. 3 for managing grease and cleaning cycles.

Referring now to FIGS. 3 and 5, a controller board 110 may execute a stored program 118 held in a memory 120 using a processor 122 communicating with memory 120. The program 118 may selectively operate the grease discharge pump 90 both on a periodic basis during the cooking of foods that express grease and only in cooking modes associated with foods that express grease in order to conserve energy. The program 118 implements this functionality by communicating with a cooking program also executed by the controller board 110 and the control panel 111. The cooking program generally includes and implements pre-stored schedules of cooking times and temperatures for different foods. The cooking program may also allow manual setting of temperatures and times.

The program 118 also implements a cleaning program associated with the operation of the cleaning assembly 116. The program 118 may selectively operate the valve 98 during the cleaning program to fill the reservoir chamber with a predetermined volume of freshwater. The program 118 may also selectively operate the liquid cleaner pump 94 during the cleaning program to fill the reservoir chamber with concentrated liquid cleaning 92, for example, if cleaning tablets are not used. The program 118 may also selectively operate the pump 100 during the cleaning program to wash the oven 40 by pumping liquid cleaning solution 107 through the shooter tube 108 into the oven cavity. The program 118 may also selectively operate the suction pump 104 during the cleaning program to drain the wastewater 102 from the reservoir chamber 22 after washing.

The program 118 implements this functionality by communicating with a cleaning program (e.g., light clean, medium clean, heavy clean, forced rinse) also executed by the controller board 110 and the control panel 111. The cleaning program generally includes and implements pre-stored schedules of cleaning step duration, cleaning step order, and oven temperature, for different cleaning modes. The cleaning program may also allow manual setting of cleaning step duration, cleaning step order, and oven temperature.

Referring now to FIG. 5, a cooking cycle, as indicated by process block 200, may be initiated by indication of a particular cooking mode, captured by the cooking program 118 through cooking mode buttons 124 on control panel 111, such as may indicate, for example, a desired cooking schedule for cooking of chicken. In this regard, a particular button 124 may be labeled with indicia indicating roasted chicken, for example.

During the cooking cycle, a pump cycle, as indicated by process block 202, in which grease discharge pump 90 is turned on for a brief period of time or periodically may be initiated depending on the cooking program. Alternatively, the pump cycle 202 may be initiated by pressing of a special grease purge button 126 indicating a desire to manually operate the grease discharge pump 90.

During the cooking cycle 200, generally, grease will drop from the cooking food through the drainpipe 28 to be retained by the reservoir chamber 22. During process block 202, grease discharge pump 90 is activated to communicate with the reservoir chamber 22 to discharge accumulated grease 33 through the grease discharge port 34. The grease discharge pump 90 may pump the grease through a conduit of arbitrary length to a collection vessel, for example, removed from the oven 40 for convenient access. The removal path may include a conduit in the from of an inverted U-tube whereby the inverted-U extends higher than the upper wall 39 of the reservoir chamber to prevent excess grease from leaving the conduit if the reservoir chamber overflows. The "siphon" prevents the grease 33 from flowing back into the cooking chamber 58 and out of the inverted "U" since the grease 33 in the conduit cannot be higher than the water level at the source reservoir chamber 22. The grease discharge pump 90 may communicate with the controller board 110 to be controlled thereby according to the cooking program. Alternatively, a grease discharge valve may replace the grease discharge pump 90 and the inverted U-tube for controlling the flow of grease. The grease discharge valve may control the discharge of grease through the grease discharge port 34, and may be under the control of the controller board 110. The controller board 110 may communicate with the grease discharge valve to allow the movement of grease out of the reservoir chamber 22, as provided by the cooking program 118.

When the cooking cycle 200 is ended, a cleaning cycle, as indicated by process block 204, may be initiated by indication that a stored value, such as time since last cleaning or number of cooking cycles since last cleaning, meets a predetermined level. For example, the amount of time elapsed or number of cooking cycles since last cleaning is compared to a stored cleaning schedule providing a value representing a desired frequency of cleaning. If the stored Value meets the predetermined level, the program 118 proceeds to process block 204. Alternatively, the cleaning cycle 204 may be initiated by pressing a special clean cycle button 128 indicating a desire to manually activate the cleaning cycle 204. The user may select a desired cleaning mode, for example, heavy, medium or light cleaning, or quick rinse cycle. If the cleaning cycle 204 is not initiated, the program 118 may be allowed to loop back to process block 200 to allow a subsequent cooking cycle 200. During the cleaning cycle 204, the grease discharge pump 90 is turned off. The grease discharge pump 90 is allowed to operate during the cooking cycle 200.

During the cleaning cycle 204, the reservoir chamber 22 is filled with freshwater 96, as indicated by process block 206, passing through the freshwater inlet port 83 of the left sidewall 35. A valve 98 may control the delivery of freshwater 96 through the freshwater inlet port 83 to the reservoir chamber 22, and may be under the control of the controller board 110. The controller board 110 may communicate with the valve 98 to deliver a predetermined volume of freshwater 96 into the reservoir chamber 22, as provided by the cleaning program. The controller board 110 may also communicate with a water level sensor (not shown) so that additional water is added through valve 98 when water is below a water level 214. At desired water level 214, the reservoir chamber 22 is filled with, for example, approximately 1 gallon of fluid, and the reservoir chamber 22 is generally filled halfway or below halfway, The desired water level 214 may be above the cleaning solution outlet port 84 and drainage port 88, and below the freshwater inlet port 83 and liquid cleaner port 80. However, it is contemplated that the water level 214 may also be at or above the level of the freshwater inlet port 83 and liquid cleaner port 80. Alternatively, a freshwater pump may replace valve 98. The freshwater pump may control the movement of water through the freshwater inlet port 83, and may be under the control of the controller board 110. The controller board 110 may communicate with the freshwater pump to pump the freshwater into of the reservoir chamber 22, as provided by the cleaning program.

As indicated by process block 208, a cleaning agent is added to the reservoir chamber 22. When cleaning tablets 91 are used, a desired number of cleaning tablets 91, for example, one to four cleaning tablets, are placed into the reservoir chamber 22 through the drainpipe 28 opening where the tablets 91 are dropped into the freshwater 96 of the reservoir chamber 22 and are gradually dissolved in the freshwater 96 to produce a cleaning solution 107. For example, the tablets 91 may last for a desired number of cleaning cycles so that freshwater added at the beginning of each cleaning cycle will continue to produce a cleaning solution 107.

Alternatively, the reservoir chamber 22 may be filled with a concentrated liquid cleaner 92 that is mixed with the freshwater 96 of the reservoir chamber 22 to produce a cleaning solution 107. The concentrated liquid cleaner 92 passes through a liquid cleaner inlet port 80 of the left sidewall 35 into the reservoir chamber 22. The liquid cleaner pump 94 may pump the concentrated liquid cleaner 92 through a conduit 76 of arbitrary length from a solution container 71, for example, stored on an external shelf 60 for convenient access (see FIG. 1), to the liquid cleaner port 80 of reservoir chamber 22. The liquid cleaner pump 94 may communicate with the controller board 110 to be controlled thereby. The controller board 110 may communicate with the liquid cleaner pump 94 to deliver a predetermined amount of concentrated liquid cleaner 92 into the reservoir chamber 22, as provided in the cleaning program. The concentrated liquid cleaner 92 may be pumped into the reservoir chamber 22 at the beginning of each cleaning cycle sequence, for example, after or about the same time that the freshwater 96 is added. Alternatively, a liquid cleaner valve may replace liquid cleaner pump 94. The liquid cleaner valve may control the movement of liquid cleaner through the liquid cleaner inlet port 80, and may be under the control of the controller board 110. The controller board 110 may communicate with the liquid cleaner valve to permit the movement of liquid cleaner into the reservoir chamber 22, as provided in the cleaning program.

Once the reservoir chamber 22 is filled with cleaning solution 107, either through cleaning tablets 91 or concentrated liquid cleaner 92, the cleaning cycle proceeds to process block 210, whereby the pump 100 delivers cleaning solution 107 to the shooter tube 108. The pump 100 communicates with the controller board 110 to be controlled thereby. The pump 100 discharges the cleaning solution 107 out through the cleaning solution outlet port 84 to the pump 100. The pump 100 then delivers the cleaning solution 107 back through the shooter tube port 86 of the reservoir chamber 22 to the shooter tube 108. The controller board 110 may communicate with the pump 100 to deliver cleaning solution 107 to the shooter tube 108 for a predetermined duration or for a predetermined volume of cleaning solution 107, as provided by the cleaning program. Alternatively, the pump 100 will continue to cycle the cleaning solution 107 from the reservoir chamber 22 to the shooter tube 108 until the oven meets a desired visual cleanliness, and whereby the user may manually end the washing step 210.

During washing, the shooter tube 108 discharges the cleaning solution at a high-pressure force and volumetric rate, for example, between 5-10 gallons per minute and preferably at least 7 gallons per minute, allowing the cleaning solution 107 to contact the upper wall 42 of the cooking chamber 58. The cleaning solution 107 ricochets off the upper wall 42 to contact and clean the sidewalls 64 and 48. The spit motor 74 may be activated to rotate spit assembly 82, facilitating the deflection, and dispersal of the cleaning solution 107 onto the sidewalls of the cooking chamber 58, and to clean the spit assembly 82 itself. Generally, the wastewater 109 will drip from the oven 40 walls and spit assembly 82, and fall into the drainpipe 28 to be retained by reservoir chamber 22.

Next, a draining step, as indicated by process block 210, will activate the suction pump 104 to discharge the wastewater 102 through the waste drain port 88 and out to a sanitary sewer line. For example, the waste drain port 88 may discharge onto a floor drain or the like. The removal path may include a conduit in the form of an inverted U-shape whereby the inverted extends higher than the upper wall 39 of the reservoir chamber to prevent excess wastewater from leaving the conduit were the reservoir chamber to overflow. The "siphon" prevents the wastewater 102 from flowing back into the cooking chamber 58 and out of the inverted "U" since the wastewater 102 in the conduit cannot he higher than the water level at the source reservoir chamber 22. The suction pump 104 may communicate with the controller board 110 to be controlled thereby. Alternatively, a wastewater discharge valve may replace the suction pump 104 and the inverted U-tube. The wastewater discharge valve may control the discharge of wastewater through the waste drain port 88, and may be under the control of the controller board 110. The controller board 110 may communicate with the wastewater discharge valve to permit the movement, of wastewater out of the reservoir chamber 22, as provided by the cleaning program.

The program 118 may loop back to process block 206 to continue cleaning until a set number of cleaning cycles is complete, a predetermined time has elapsed (for example 1-3 hours) or the oven has met predetermined, visual cleanliness. Alternatively, the cleaning cycle 204 may end by pressing the clean cycle button 128 indicating a desire to manually end the cleaning cycle 204. After the cleaning cycle 204 is ended, the program 118 may loop back, to allow for a new cooking cycle 200 to be initiated.

In an exemplary cleaning cycle 204, the process blocks 206 (water fill), 208 (cleaning agent fill-omitted if using cleaning tablets), 210 (wash) and 212 (drain) are run through consecutively, for example, two to three times, in order to remove grease and oils 33 from the oven 40. To perform a more thorough clean, the duration of step 210 (wash) may be extended to provide a longer wash. Next, the process blocks 206 (water fill), 208 (cleaning agent fill), and 210 (wash) are performed at the same time followed by step 210 (wash) and step 212 (drain) consecutively to perform a rinse cycle. In this respect, the cleaning solution may be re-circulated for an additional rinse before it is drained. The rinse cycle is run through consecutively, for example, three to four times, in order to fully rinse the oven 40 and the reservoir chamber 22.

It is contemplated that any schedule of process blocks 206 (water fill), 208 (cleaning agent fill-omitted if using cleaning tablets), 210 (wash) and 212 (drain) may be used in a cleaning schedule, and any duration of steps or order of steps may be performed. For example, steps may be performed simultaneously or sequentially, and repeated in any order, as desired by the cooking schedule.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller" and "a processor" should be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An oven comprising:
    an oven housing defining a cooking volume and having a door providing access to a cooking volume and sealing the cooking volume when the door is in a closed position;
    a heater communicating with the cooking volume to heat the same; and
    a cleaning assembly including a reservoir chamber communicating with the cooking volume through a drain opening in a floor of the oven volume, a first suction pump communicating through a first opening in the reservoir to pump a cleaning solution out of the reservoir and expel the cleaning solution to the cooking volume through a nozzle positioned below a center of the cooking volume between a ceiling of the oven volume and the floor of the oven volume, and a conduit communicating with a second opening in the reservoir chamber and a collection container to permit a movement of grease out of the reservoir into the collection container.

2. The oven of claim 1 wherein the nozzle is configured to expel the cleaning solution through the drain opening.

3. The oven of claim 2 wherein the nozzle is concentric with the drain opening.

4. The oven of claim 1 wherein the nozzle is configured to expel the cleaning solution through a floor of the oven.

5. The oven of claim 1 further comprising an electronic computer communicating with the heater element, the first pump, and a second pump communicating with the conduit and executing a program stored in a non-transient medium to (a) receive commands from the user indicating a cooking schedule associated with cooking times and temperatures; (b) activate the second pump according to a selection of a cooking schedule indicating cooking of grease producing foodstuffs; (c) receive commands from the user indicating a cleaning schedule associated with cleaning times and temperatures; and (d) activate the first pump according to a selection of the cleaning schedule.

6. The oven of claim 1 further comprising a conduit communicating with a third opening in the reservoir chamber and a freshwater source to provide freshwater into the reservoir.

7. The oven of claim 1 further comprising a valve disposed in the conduit that can be actuated to control grease flow from the reservoir into the collection container.

8. The oven of claim 1 wherein the nozzle is positioned to expel a stream of cleaning solution to a ceiling of the cooking volume.

9. The oven of claim 1 wherein the first suction pump is sized to provide sufficient force and volume to exert a stream of cleaning solution to a ceiling of the cooking volume.

10. A method of operating an oven, the method comprising the steps of:
   (a) providing an oven having:
      an oven housing defining a cooking volume and having a door providing access to a cooking volume and sealing the cooking volume when the door is in a closed position;
      a heater communicating with the cooking volume to heat the same;
      a cleaning assembly including a reservoir chamber communicating with the cooking volume through a drain opening in the floor of the oven volume, a first suction pump communicating through a first opening in the reservoir to pump cleaning solution out of the reservoir and expel the cleaning solution to the cooking volume through a nozzle positioned below a center of the cooking volume between a ceiling of the oven volume and the floor of the oven volume, and a conduit communicating with a second opening in the reservoir chamber and a collection container to permit a movement of grease out of the reservoir into the collection container;
   (b) activating at least one of a second suction pump or a valve communicating with the conduit to permit a movement of grease from the reservoir;
   (c) introducing a cleaning agent into the reservoir to produce a cleaning solution; and
   (d) activating the first suction pump to pump the cleaning solution from the reservoir through the nozzle.

11. The method of claim 10 further comprising a step between steps (b) and (c) of opening a water inlet valve to allow freshwater to fill the reservoir chamber.

12. The method of claim 11 further comprising a step after step (d) of activating a third suction pump to remove wastewater from the reservoir chamber.

13. The method of claim 12 wherein step (c) further comprises activating a fourth pump to pump liquid cleaner into the reservoir chamber.

14. The method of claim 12 wherein step (c) further comprises inserting a cleaning tablet into the reservoir chamber through the drain opening.

15. The method of claim 10 wherein the oven further includes a spit assembly rotatably attached proximal the sidewalls and carrying at least one spit configured to support a food product that is heated by the heater, and further providing a step of rotating the spit assembly during step (d).

16. An oven comprising:
   an oven housing defining a cooking volume and having a door providing access to a cooking volume defined by sidewalls and sealing the cooking volume when the door is in a closed position;
   a heater communicating with the cooking volume to heat the same; and
   a cleaning assembly including a reservoir chamber communicating with the cooking volume through a drain opening at a floor of the oven volume, a suction pump communicating through an opening in the reservoir to pump cleaning solution out of the reservoir and to a nozzle positioned below a center of the cooking volume between a ceiling of the oven volume and the floor of the oven volume and configured to deliver the cleaning solution to the cooking volume,
   wherein the cleaning assembly further comprises a second suction pump communicating with a second opening in the reservoir chamber to pump grease out of the reservoir.

17. The oven of claim 16 further comprising:
   a radiating heating system disposed in the cooking volume that receives an electrical current and produces radiating heat;
   a convection heat system disposed in the cooking volume including one or more heating elements that produce heat in response to an electrical current and a rotating fan that draws incoming air from the cooking volume into the convection heat system, forces the air over the heating elements to become heated, and expels the heated air into the cooking volume; and
   a spit assembly rotatably attached proximal the side walls and carrying at least one spit configured to support a food product that is heated by the radiating heat source and the convection heat source.

18. The oven of claim 16 wherein the nozzle extends in an upward direction from the floor of the oven volume.

19. The oven of claim 16 wherein the nozzle extends through and is concentric with the drain opening to provide clearance around the nozzle for grease and wastewater passthrough.

* * * * *